(12) United States Patent
Liu et al.

(10) Patent No.: US 9,395,800 B2
(45) Date of Patent: Jul. 19, 2016

(54) ENABLING INSTANT HANDWRITTEN INPUT ON MOBILE COMPUTING DEVICES

(75) Inventors: Eric Liu, Santa Clara, CA (US); Stefan J. Marti, Santa Clara, CA (US); Seung Wook Kim, Cupertino, CA (US); Alison Wong, Menlo Park, CA (US); Edward Stanley Ott, IV, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 92 days.

(21) Appl. No.: 13/250,811

(22) Filed: Sep. 30, 2011

(65) Prior Publication Data

US 2013/0082937 A1    Apr. 4, 2013

(51) Int. Cl.
G06F 1/32       (2006.01)
G06F 3/0488     (2013.01)
G06F 3/0354     (2013.01)
G06F 21/31      (2013.01)

(52) U.S. Cl.
CPC .......... *G06F 1/3262* (2013.01); *G06F 3/03545* (2013.01); *G06F 3/04886* (2013.01); *G06F 1/3203* (2013.01); *G06F 21/31* (2013.01)

(58) Field of Classification Search
CPC ..... G06F 1/3203; G06F 1/3265; G06F 21/31; G06F 1/3262; G06F 1/3293; G06F 1/3287; G06F 1/3296; G06F 3/03545; G06F 3/04886
USPC ............................ 345/173–179; 715/764–864
See application file for complete search history.

(56) References Cited

U.S. PATENT DOCUMENTS

| | | | |
|---|---|---|---|
| 5,821,931 A * | 10/1998 | Berquist et al. ............... | 715/784 |
| 6,249,276 B1 * | 6/2001 | Ohno ........................... | 345/173 |
| 6,256,008 B1 * | 7/2001 | Sparks et al. ................. | 345/618 |
| 7,030,860 B1 * | 4/2006 | Hsu et al. ..................... | 345/173 |
| 7,053,883 B1 * | 5/2006 | Kwok et al. .................. | 345/156 |
| 7,113,173 B1 * | 9/2006 | Bi et al. ....................... | 345/169 |
| 7,292,230 B2 * | 11/2007 | Tokkonen ............. | G06F 3/0488 345/173 |
| 7,562,241 B2 * | 7/2009 | Nurmi .......................... | 713/323 |
| 7,593,000 B1 * | 9/2009 | Chin ............................. | 345/156 |
| 8,174,503 B2 * | 5/2012 | Chin ............................. | 345/173 |
| 8,242,389 B2 * | 8/2012 | Chen .................... | G06F 1/1626 178/19.01 |
| 8,434,153 B2 * | 4/2013 | Sundaramurthy et al. ...... | 726/26 |

(Continued)

FOREIGN PATENT DOCUMENTS

CN        101350847 A  *  1/2009

OTHER PUBLICATIONS

"Recognizeme: Unlock iPhone Using Biometric Facial Recognition"; May 22, 2011; 7 pages.

(Continued)

*Primary Examiner* — Temesgh Ghebretinsae
*Assistant Examiner* — Michael J Jansen, II
(74) *Attorney, Agent, or Firm* — Norton Rose Fulbright US LLP

(57) ABSTRACT

Embodiments of the present invention disclose a method and system for enabling instant handwriting input on a mobile computing device. According to one embodiment, while the mobile device is in an inactive state and identity-protected, an activation event associated with a writing tool operated by a user is detected. In response to the activation event, the mobile computing device is switched from the inactive state to a low power state in which the mobile computing device is configured to accept and store handwritten input while remaining identity-protected.

16 Claims, 5 Drawing Sheets

(56) References Cited

U.S. PATENT DOCUMENTS

| | | | | |
|---|---|---|---|---|
| 8,537,130 | B2* | 9/2013 | Chan | G06F 1/1626 345/173 |
| 8,704,774 | B2* | 4/2014 | Chang | G06F 3/0488 345/173 |
| 8,726,184 | B2* | 5/2014 | Strode | G06Q 10/107 715/751 |
| 8,881,269 | B2* | 11/2014 | Fleizach | G06F 3/04883 345/175 |
| 8,965,449 | B2* | 2/2015 | Alvarez Rivera | G06F 1/1656 455/550.1 |
| 9,009,630 | B2* | 4/2015 | Kruzeniski | G06F 21/6209 715/817 |
| 2004/0085351 | A1* | 5/2004 | Tokkonen | G06F 3/0488 715/741 |
| 2005/0057534 | A1* | 3/2005 | Charlier | 345/179 |
| 2006/0007189 | A1* | 1/2006 | Gaines et al. | 345/179 |
| 2006/0012577 | A1* | 1/2006 | Kyrola | 345/173 |
| 2006/0117197 | A1* | 6/2006 | Nurmi | 713/323 |
| 2006/0256097 | A1 | 11/2006 | Oliver | |
| 2007/0016958 | A1* | 1/2007 | Bodepudi et al. | 726/27 |
| 2007/0273665 | A1* | 11/2007 | Park et al. | 345/173 |
| 2007/0273673 | A1* | 11/2007 | Park et al. | 345/173 |
| 2008/0055276 | A1* | 3/2008 | Chang | G06F 3/0488 345/175 |
| 2008/0184360 | A1* | 7/2008 | Kornilovsky et al. | 726/17 |
| 2009/0006991 | A1 | 1/2009 | Lindberg et al. | |
| 2009/0061837 | A1* | 3/2009 | Chaudhri | G06F 3/0481 455/418 |
| 2009/0114458 | A1* | 5/2009 | Chen et al. | 178/19.01 |
| 2009/0115745 | A1* | 5/2009 | Chuang | G06F 1/1626 345/179 |
| 2009/0144649 | A1* | 6/2009 | Strode et al. | 715/780 |
| 2009/0264159 | A1 | 10/2009 | Hsieh et al. | |
| 2010/0001967 | A1 | 1/2010 | Yoo | |
| 2010/0060586 | A1* | 3/2010 | Pisula et al. | 345/169 |
| 2010/0138914 | A1* | 6/2010 | Davis et al. | 726/19 |
| 2010/0159995 | A1* | 6/2010 | Stallings et al. | 455/566 |
| 2010/0162182 | A1* | 6/2010 | Oh et al. | 715/863 |
| 2010/0306693 | A1* | 12/2010 | Brinda | 715/784 |
| 2010/0306705 | A1* | 12/2010 | Nilsson | 715/835 |
| 2010/0306718 | A1* | 12/2010 | Shim et al. | 715/863 |
| 2010/0313050 | A1 | 12/2010 | Harrat et al. | |
| 2010/0313263 | A1* | 12/2010 | Uchida et al. | 726/18 |
| 2010/0325721 | A1* | 12/2010 | Bandyopadhyay | G06F 21/316 726/19 |
| 2011/0034208 | A1* | 2/2011 | Gu et al. | 455/550.1 |
| 2011/0041102 | A1* | 2/2011 | Kim | 715/863 |
| 2011/0047368 | A1* | 2/2011 | Sundaramurthy et al. | 713/100 |
| 2011/0076981 | A1* | 3/2011 | Singh et al. | 455/404.1 |
| 2011/0080367 | A1* | 4/2011 | Marchand et al. | 345/174 |
| 2011/0105193 | A1 | 5/2011 | Lee et al. | |
| 2011/0117970 | A1 | 5/2011 | Choi | |
| 2012/0084691 | A1* | 4/2012 | Yun | 715/769 |
| 2012/0084734 | A1* | 4/2012 | Wilairat | 715/863 |
| 2012/0127096 | A1* | 5/2012 | Chan | 345/173 |
| 2012/0131658 | A1* | 5/2012 | Ramaswamy | G06F 21/31 726/7 |
| 2012/0154303 | A1* | 6/2012 | Lazaridis et al. | 345/173 |
| 2012/0258773 | A1* | 10/2012 | Alvarez Rivera et al. | 455/556.1 |
| 2012/0306927 | A1* | 12/2012 | Lee | G06F 3/041 345/660 |
| 2013/0036377 | A1* | 2/2013 | Colley | 715/764 |
| 2013/0326582 | A1* | 12/2013 | Kruzeniski | G06F 21/6209 726/2 |

OTHER PUBLICATIONS

HOODSTAH94; "Quickwidgets 3.0 Lockscreen Mod iPhone—iPod Touch!"; Jan. 6, 2010, 3 pages.

Johnson, J. et al.; "100 Apps for Taking Notes on Your iPhone"; Apr. 5, 2011; 22 pages.

* cited by examiner

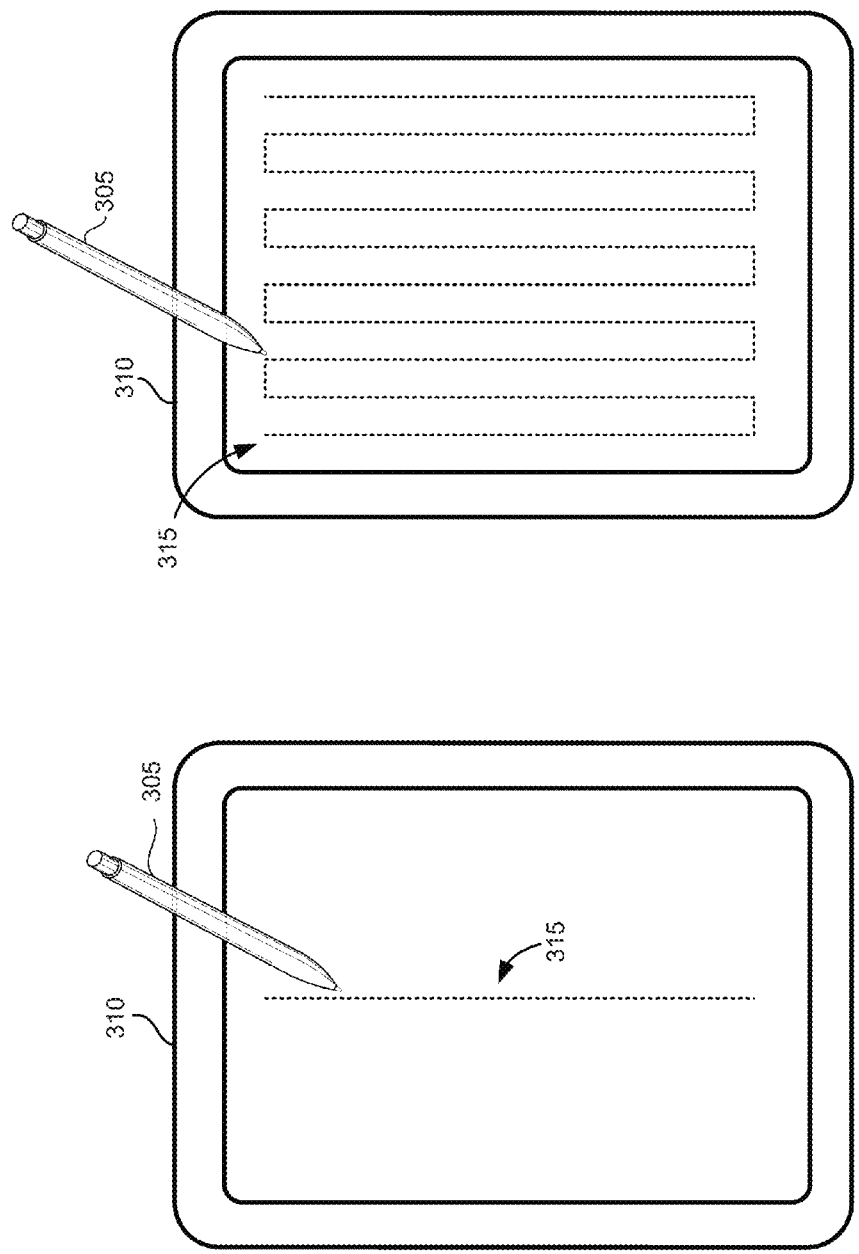

ENABLING INSTANT HANDWRITTEN INPUT ON MOBILE COMPUTING DEVICES

BACKGROUND

The emergence and popularity of mobile computing has made portable electronic devices, due to their compact design and light weight, a staple in today's marketplace. Moreover, providing efficient and intuitive interaction between devices and users thereof is essential for delivering an engaging and enjoyable user-experience. For example, stylus input systems provide a natural user interface for computing systems by enabling a specific point on a touch-enabled display screen to be selected or identified when the user physically touches the display with a pen-like device or stylus. Generally, current pen solutions require the portable electronic device to be in a powered or active state and running a particular application for accepting pen-based input. However, such input is most effective if a user can immediately write on the surface in a similar fashion to writing on a paper notebook.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 3A and 3B are front views of a mobile computing device having a sensing detection element formed thereon according to examples of the present invention.

DETAILED DESCRIPTION OF THE INVENTION

Figure 1:
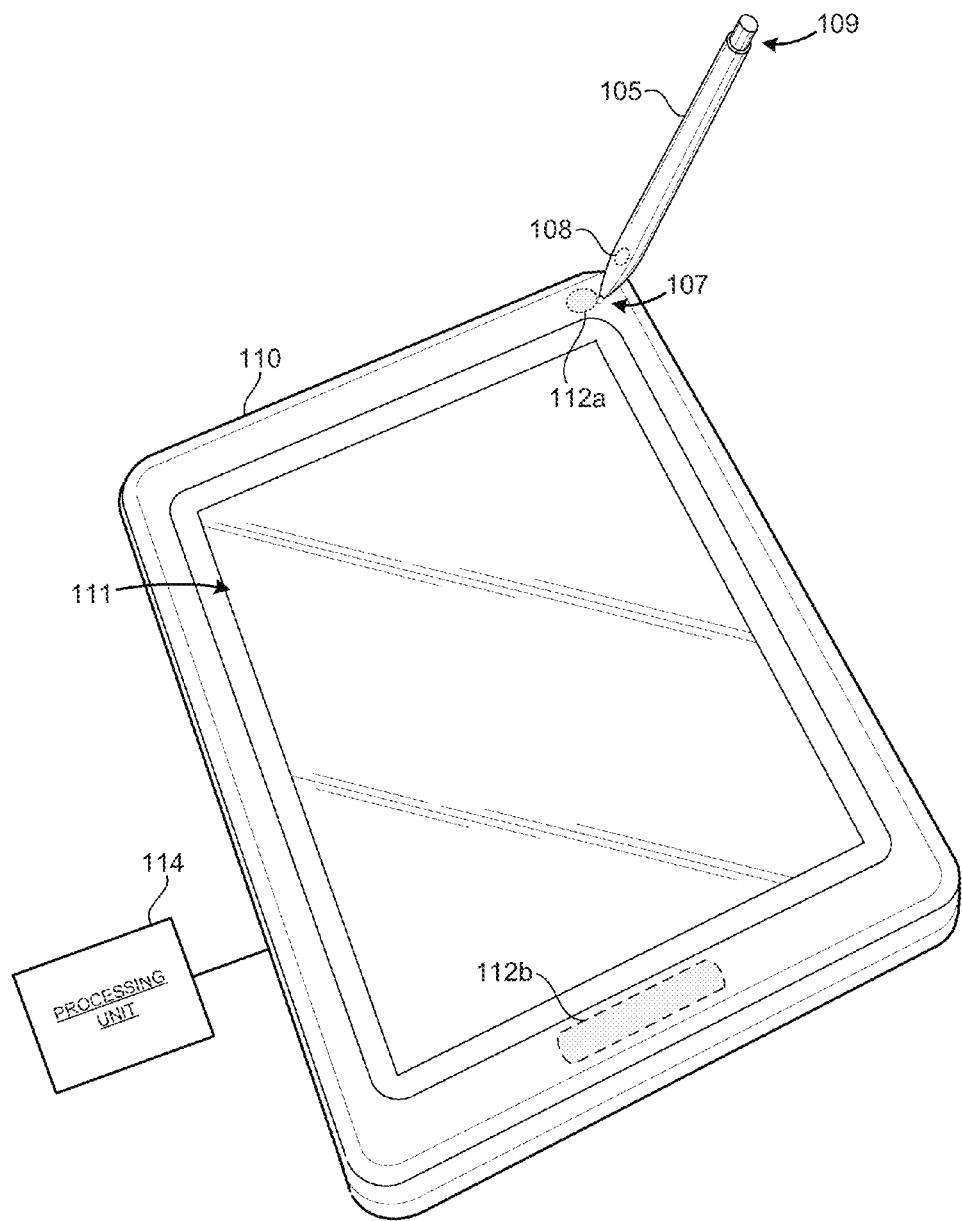
FIG. 1 is a three-dimensional perspective view of a mobile computing device configured to detect an activation event using a writing tool according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Often times, a user may need to take down a quick note (e.g., name, task, phone number, etc.) while in transit. Today, there are a few prior solutions for quickly memorializing information on a mobile computing device. Voice memos are one solution, but voice input is not as powerful or as flexible as written input as it is sequential (i.e., linear) and transient (i.e., cannot be edited easily, such as deleting a section), which is a disadvantage when compared to handwritten notes. The conventional process for enabling a user to write notes on a portable electronic device includes the following steps: (1) user manually turning on the device, (2) unlocking the device from a locked state (e.g., password-protected), (3) opening a note-taking or similar application, (4) opening a keyboard (virtual or physical), and (5) entering or typing the notation into the application. Thereafter, the user must save the data and turn off the device. These steps are not optimal when the user is "on the go" and must rely on quick note-taking. For instance, if the user is walking to their car, then the number of steps required to jot down notes on their mobile device become prohibitive and makes quick note-taking impractical.

Moreover, the password or identity-protected mode prevents accidental usage of the mobile device by locking device access until a pin code or gestural swipe is used to unlock the phone. For low security input activity (e.g., note taking), a device unlock action is unnecessary. For instance, the referenced use case scenario of rapid note taking does not involve harmful false input such as mistakenly dialing a phone number or viewing/reading secure email. Thus, there is a need in the art for a unique interface and input mode in which the device is still locked but handwritten input can be accepted.

Examples of the present invention provide a method and system for instant handwritten input on mobile computing devices. According to one example, a combination of sensors or similar elements are utilized to wake up the mobile device upon detection of an activation event, and software allows the mobile device to immediately capture handwritten input from an operating user via a pen stylus. That is, the configuration of the present examples enable handwritten input on a mobile device while maintaining the device in an identity-protected mode so as to allow a more functional and natural use of pen input in a mobile environment.

Referring now in more detail to the drawings in which like numerals identify corresponding parts throughout the views, FIG. 1 is a three-dimensional perspective view of a mobile computing device configured to detect an activation event using a writing tool according to an example of the present invention. As shown here, the mobile computing device 110 includes a processing unit 114 and multiple touch sensor areas 112a and 112b positioned on an outer periphery of a display surface 111. Though FIG. 1A depicts the touch sensing areas 112a and 112b near a corner and lower region respectively, the touch sensing areas may be positioned anywhere along the surface of the mobile computing device 110. In one example, the touch sensor areas 112a and 112b may comprise of receiver coils configured to form a magnetic field with another device for facilitating transition of the mobile device from a sleep mode to a low power mode. According to one example, the mobile computing device 110 enters a sleep or inactive state/mode when not it in use in order to conserve power. While in an inactive state the mobile computing device is unable to process complex user input. This is because the processing unit or integrated circuit that processes complex data is unpowered since considerable power (e.g., several hundred milliwatts) is required to accept input across the entire display surface 111. According to the present example, a proximity sensing element 108 such as a radio frequency (RF) or near-field communication (NFC) transmitting coil is placed near a front portion 107 (opposite back portion 109) of the pen stylus or writing tool 105. When the front portion 107 of the writing tool physically touches or is placed in close proximity to one of the touch sensor areas 112*a* and 112*b* of the mobile device 110, a magnetic field is formed so as trigger an activation event and cause the mobile device to switch from an inactive state to a low power state. As used herein, a lower power state represents a processing mode in which the mobile computing device 110 and processing unit 114 are not fully powered (display 111 is powered), but may accept handwritten user input while remaining in a secure and identity-protected state.

Figure 2A:
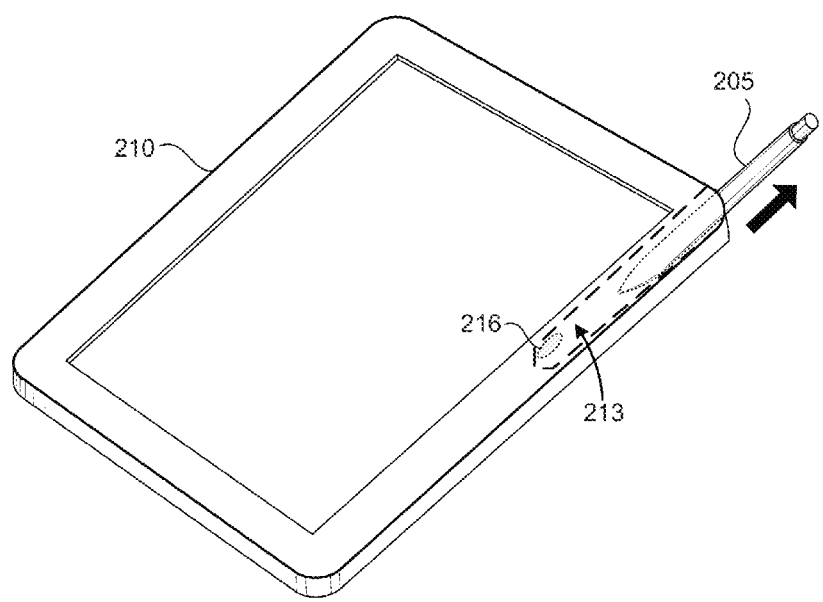
FIGS. 2A and 2B are three-dimensional perspective views of a mobile computing device configured to detect various activation events according to examples of the present invention.
Figure 2B:
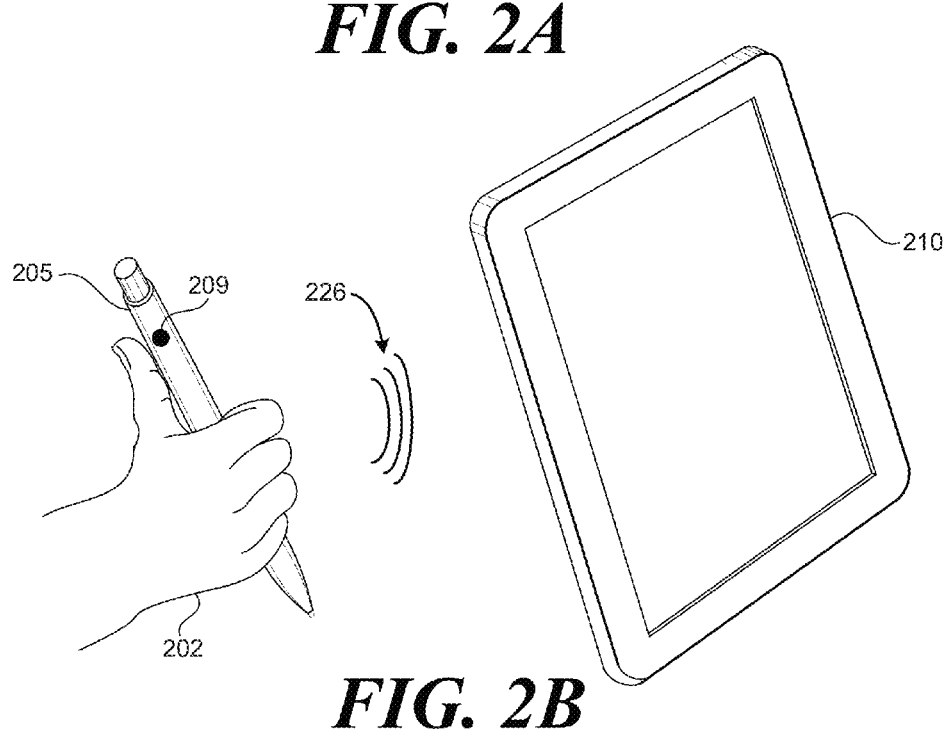

FIGS. 2A and 2B are three-dimensional perspective views of a mobile computing device configured to detect various activation events according to an example of the present invention. FIG. 2A depicts an activation event caused by an operating user removing the pen stylus from a storage housing within the mobile device. As shown in the present example, the trigger to switch the device 210 from an inactive state to a lower power state may arise when the writing tool 205 is removed from an internal storage area 213 of the mobile device 210. Detection of this removal action (i.e., pen stylus 205 from storage area 213) may occur via a sensing element 216 such as a hall effect sensor or simple mechanical switch for example positioned adjacent to the internal storage area 213. In accordance with the present example, as the writing tool 205 is lifted out and away from the storage area 213, the sensing element 216 is activated and sends out a signal that causes the processing unit to switch the mobile computing device 210 from an inactive state to a low power state.

FIG. 2B depicts yet another activation event in which the writing tool transmits wireless communication signals to the mobile device. For instance, an activation button or switch 209 may be incorporated on the writing tool 205. Here, button 209 is utilized to send a wireless signal 226 to the mobile device 210. As shown in FIG. 2B, this button 209 may be positioned on an upper location of the pen stylus 205 so as to be conveniently accessible by the user 202. Furthermore, wireless communication via signal 226 may be accomplished using infrared, Bluetooth or any other short-range wireless communication protocol that is detectable by the mobile device while in a lower power state. If signal 226 is received by the mobile device while in an inactive state, receipt of the signal 226 will serve to awaken the mobile device from the sleep state and enter a low power or powered state in accordance with examples of the present invention.

FIGS. 3A and 3B are front views of a mobile computing device having a sensing detection element formed thereon according to an example of the present invention. As shown in the example of FIG. 3A, the mobile computing device 310 may incorporate a sensing detection element coplanar with the display surface 311. For instance, the detection element may operate on its own polling cycle and instead of compromising significant processing power in testing for every sensing element associated with the writing tool, the sensing element may focus on a single activation event thus consuming significantly less processing power. In the example of FIG. 3A, the sensing detection element can be drawn as a single line region 315 across the display surface 311. Alternatively, the sensing element region 315 may involve a more complex pattern so as to cover a larger area of the display surface 311 as shown in FIG. 3B. In both cases, a physical touch and movement of the writing tool 305 at any point along the sensing detection regions 315 would serve to wake up the processing unit and switch the mobile computing device 310 from an inactive state (i.e., sleep mode) to either a lower power state or an unlocked state in accordance with an example of the present invention.

Figure 4:
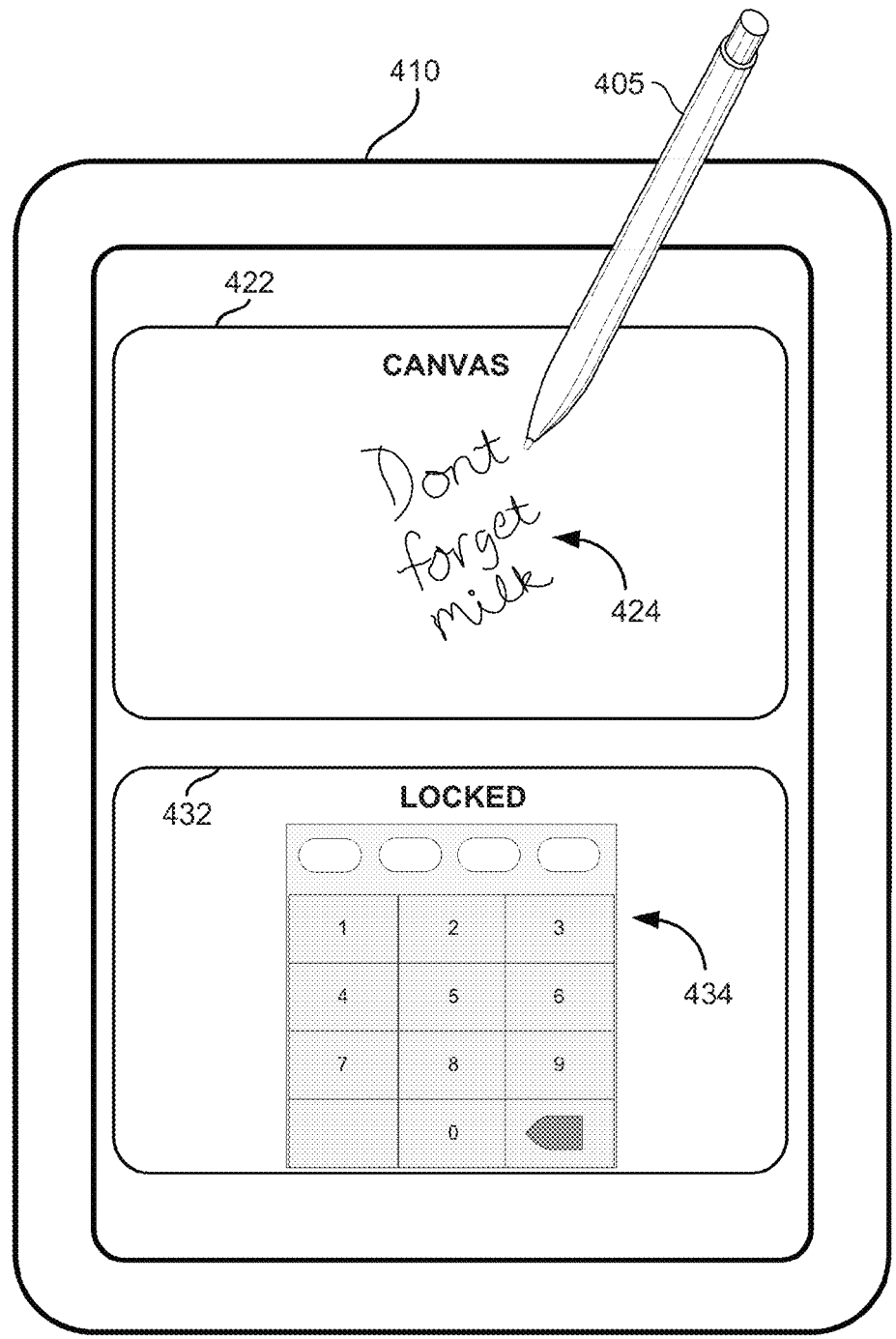
FIG. 4 is a sample illustration of a mobile computing device accepting handwritten input while in a low power state according to an example of the present invention.

FIG. 4 is a sample illustration of a mobile computing device accepting handwritten input while in a lower power state according to an example of the present invention. In the present example, the mobile computing device 410 is switched from an inactive state to a lower power state. As shown here, the mobile computing device 410 displays a first user interface 422 and a second user interface 432. The first user interface 422 is configured to accept handwriting input from a writing tool 405 held by an operating user. Consequently, handwritten input 424 may be inscribed on the mobile computing device 410 within the first user interface 422. The second user interface 432 is configured to accept input from the operating user in order to verify the identity of the user so as to place the device 410 in an unlocked state. According to one example, in order to maintain secure nature of the mobile device while in the low power state, the handwritten input 424 within the first user interface 422 is simply stored and not processed by the mobile device 410. The user may access the handwritten input 424 at a later time and then convert the information into a document, contact, calendar event, task, phone call, or similar application event. Alternatively, handwritten input 424 may be used as biometric information for identity confirmation so as to unlock the mobile computing device 410. In such an implementation, as the operating user writes on the display surface, the processing unit of the mobile device 410 analyzes the user's writing style and automatically unlocks the screen upon verification.

Figure 5:
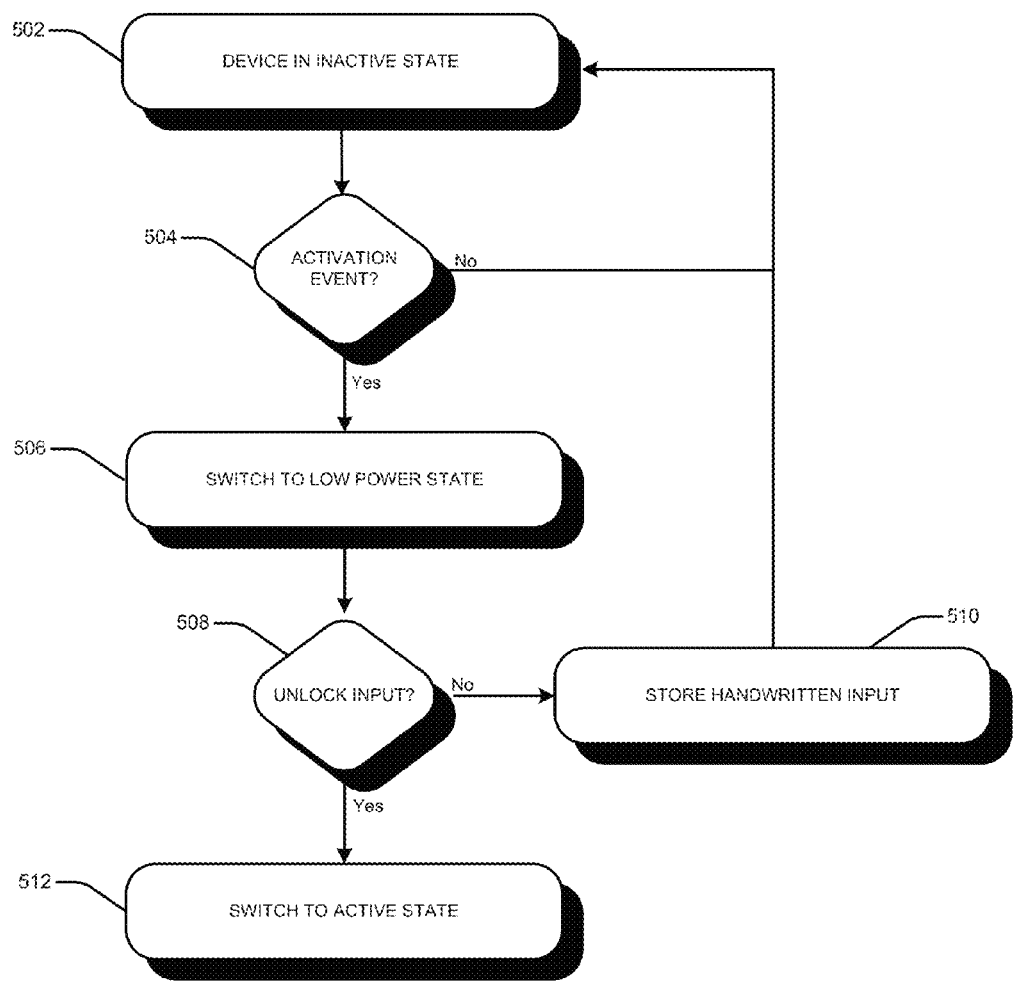
FIG. 5 is a simplified flow chart of the processing steps for implementing instant handwritten input on a mobile computing device using a writing tool according to an example of the present invention.

FIG. 5 is a simplified flow chart of the processing steps for implementing instant handwritten input on a mobile computing device using a writing tool according to an example of the present invention. In step 502, the device is placed in an inactive state and identity-protected so as securely lock the mobile device and prevent accidental touches on a display surface thereof. Next, in step 504, the processing unit detects an activation event triggered by an operating user. As discussed above, the activation event may include, but is not limited to, any of the following actions: physical or near contact of the writing tool on a touch sensing area of the mobile device, removal of the writing tool from an integrated storage area of the mobile device, depression of an activation button on the writing tool so as to send a wireless signal to mobile device, or movement of the writing tool along a sensing detection region on the display surface. Upon detection of the activation event, in step 506, the processing unit causes the mobile computing device to switch from a sleep mode or inactive state to a lower power state. If an unlock password or gesture is not entered by the user in step 508, then the handwritten input is stored locally on the device for later access once the mobile device is unlocked. On the other hand, if a password, gesture, biometric information, or any other identity information is entered by the operating user, then the mobile computing device is switched from a low power state to a fully-powered and functional active state in step 512.

Embodiments of the present invention provide a method and system for providing instant handwritten input on a mobile computing device. Moreover, several advantages are afforded by the solution described in the examples of the present invention. For instance, one example embodiment allows a user to jot down a note immediately by simply removing a pen stylus from the device and start writing on the associated display screen. Such action bypasses at least three steps required of prior solutions, namely turning on the device, unlocking the device, and opening a particular application for receiving the handwritten input. Moreover, examples of the present invention allow a user to accomplish instant handwriting input in a natural and efficient manner while conserving precious battery life of the mobile device.

Furthermore, while the invention has been described with respect to exemplary embodiments, one skilled in the art will recognize that numerous modifications are possible. For example, although exemplary embodiments depict a tablet personal computer as the mobile computing device, the invention is not limited thereto. For example, the mobile computing device may be a netbook, smartphone, cell phone, or any other portable electronic device having a touch-enabled display.

Furthermore, the writing tool may be formed in any shape or size conducive to handwriting input by an operating user rather than the pen-shaped device depicted in the present examples. For example, the writing tool may be the size and shape of a highlighter, crayon, pencil, brush, or similar writing utensil. Thus, although the invention has been described with respect to exemplary embodiments, it will be appreciated that the invention is intended to cover all modifications and equivalents within the scope of the following claims.

What is claimed is:

1. A method comprising:
   detecting, while a mobile computing device (MCD) is in an identity-protected locked (IPL) state, an activation event triggered by a writing tool operated by a user; and
   responsive to detecting the activation event, exiting at least one of a sleep mode or inactive state and enabling handwritten input via movement of the writing tool on a display while the MCD remains in the IPL state,
   wherein the exiting and enabling the handwritten input includes respectively: switching the MCD from the at least one of the sleep mode or the inactive state to a lower-power state, and accepting the handwritten input while the MCD is in the lower-power state; and
   displaying simultaneously, while in the lower-power state, both a first user interface for entering handwritten data in response to the handwritten input of the user with a second user interface for unlocking the mobile device in response to the user entering a pin code for verifying the identity of the user; and
   switching the MCD from the IPL state to an unlocked state in response to the user entering the input pin code for verifying the identity of the user,
   wherein the switching to the unlocked state includes switching from the lower-power state to a fully-powered and functional active state.

2. The method of claim 1, further comprising:
   saving the handwritten input in a secure location that cannot be accessed until the MCD is switched from the IPL state to the unlocked state; and
   accessing, while the MCD is in the unlocked state, the handwritten input accepted while the MCD was in the IPL state.

3. The method of claim 1, further comprising:
   analyzing biometrically information associated with the handwritten input so as to verify the identity of the operating user.

4. The method of claim 1, wherein the activation event includes removing of the writing tool from within the MCD.

5. The method of claim 1, wherein the writing tool includes an interface button for triggering the activation event via a wireless communication protocol.

6. The method of claim 1, wherein the writing tool includes a short-range communication element and the activation event is detected based on a proximity of the communication element near a sensing area along a surface of the MCD.

7. The method of claim 1, wherein:
   the MCD includes a dedicated sensing detection region of a surface of the display and is configured to poll for a lower power signal from the writing tool, and
   the detecting requires a physical touch and movement of the writing tool across the detection region of the surface of the display.

8. A mobile computing device (MCD) comprising:
   a touch-enabled display;
   a sensor for detecting an activation event triggered by a writing tool;
   a processing unit configured to:
      receive the activation event from the sensor while the MCD is in an identity-protected locked (IPL) state,
      causing the MCD to, in response to the detection of the activation event, perform exiting at least one of a sleep mode or inactive state and enable handwritten input on the display while remaining in the IPL state,
      switch the MCD from the at least one of a sleep mode or the inactive state to a lower-power state, wherein the MCD accepts the handwritten input while the MCD is in the lower-power state;
      display simultaneously, while in the lower-power state, both a first user interface for entering the handwritten input of the user with a second user interface for unlocking the MCD in response to entering an input pincode verifying the identity of the user; and
      switch the MCD from the IPL state to an unlocked state in response to the user entering the input pin code for verifying the identity of the user,
   wherein the switch to the unlocked state includes switching from the lower-power state to a fully-powered and functional active state.

9. The MCD of claim 8, wherein the activation event is removal of the writing tool from a housing within the MCD.

10. The MCD of claim 8, wherein the writing tool includes an interface button for triggering the activation event.

11. The MCD of claim 8, wherein the writing tool includes a short-range communication element and the activation event is detected based on a proximity of the communication element near a predetermined sensing region along a surface of the MCD.

12. The MCD of claim 8, wherein the MCD includes a dedicated sensing detection region of a surface of the display and is configured to poll for a lower power signal from the writing tool, wherein detection of the activation event requires a physical touch and movement of the writing tool along the detection region of the surface of the display.

13. The MCD of claim 8 wherein, when in the low power state, handwritten input from the writing tool is saved in a secure location that cannot be accessed until the MCD is switched from the IPL state to the unlocked state.

14. The MCD of claim 8, wherein handwriting recognition is used to biometrically verify the identity of the user.

15. A method for providing instant handwritten input on a mobile computing device (MCD) having a touch-enabled display, the method comprising:
- detecting an activation event by a pen-based stylus operated by a user while the MCD is in an identity-protected locked (IPL) state and password-protected;
- switching the MCD, in response to detecting the activation event, from at least one of a sleep mode or an inactive mode to a low power mode, wherein the low power mode powers the display and enable handwritten input while the MCD remains in the IPL state;
- displaying simultaneously, while in the low power mode, both a first user interface for entering the handwritten input of the user with a second user interface for unlocking the mobile device in response to the user entering an input pin code for verifying the identity of the user;
- accepting input while the MCD remains in the IPL state in the low power mode; and switching the MCD from the IPL state to an unlocked state in response to the user entering the input pin code for verifying the identity of the user,
- wherein the switch to the unlocked state includes switching from the low power mode to a fully-powered and functional active state.

16. The method of claim 15, wherein when in the low power mode, the handwritten input is saved in a secure location that cannot be accessed until the device is placed in the unlocked state.

* * * * *